(12) United States Patent
Hansen et al.

(10) Patent No.: US 7,176,390 B2
(45) Date of Patent: Feb. 13, 2007

(54) CAPACITIVE LOAD CELL WITH MULTI-LAYER DIELECTRIC FOR EXTENDED RANGE

(75) Inventors: Mark C. Hansen, Kokomo, IN (US); William W. Fultz, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 71 days.

(21) Appl. No.: 11/070,068

(22) Filed: Mar. 2, 2005

(65) Prior Publication Data

US 2006/0196702 A1   Sep. 7, 2006

(51) Int. Cl.
- *G01L 1/14* (2006.01)
- *G01G 3/12* (2006.01)
- *B60R 21/015* (2006.01)
- *B60R 21/16* (2006.01)

(52) U.S. Cl. .................. 177/136; 177/144; 177/210 C; 177/225; 361/283.4; 361/291; 180/273; 280/735; 73/862.626

(58) Field of Classification Search ........... 73/862.626; 180/273; 280/735; 177/136, 144, 210 C, 177/225; 361/283.4, 291
See application file for complete search history.

(56) References Cited

U.S. PATENT DOCUMENTS

| | | | |
|---|---|---|---|
| 3,565,195 A * | 2/1971 | Miller et al. ............ 177/210 R |
| 3,678,378 A * | 7/1972 | Trott et al. ............. 177/210 C |
| 3,875,481 A * | 4/1975 | Miller et al. ............. 361/283.1 |
| 4,266,263 A * | 5/1981 | Haberl et al. ............ 361/283.2 |
| 4,836,033 A * | 6/1989 | Seitz ..................... 73/862.046 |
| 5,232,061 A * | 8/1993 | Neeleman ................... 177/184 |
| 5,742,471 A | 4/1998 | Barbee, Jr. et al. |
| 5,878,620 A | 3/1999 | Gilbert et al. |
| 5,986,221 A * | 11/1999 | Stanley ....................... 177/136 |
| 6,448,789 B1 | 9/2002 | Kraetzl |
| 6,499,359 B1 | 12/2002 | Washeleski et al. |
| 6,894,233 B2 * | 5/2005 | Dingwall et al. ....... 177/210 C |
| 6,999,301 B1 | 2/2006 | Sanftleben et al. |
| 2005/0043876 A1 | 2/2005 | Fultz et al. |
| 2006/0196281 A1* | 9/2006 | Koors |

* cited by examiner

*Primary Examiner*—Randy W. Gibson
(74) *Attorney, Agent, or Firm*—Jimmy L. Funke

(57) ABSTRACT

A capacitive load cell includes upper and lower capacitor plates and an intermediate dielectric comprising two or more layers of compressible material with diverse compressibility characteristics. The most easily compressed dielectric layer provides sensitivity to low occupant weight, while the less easily compressed dielectric layer(s) provide sensitivity to medium and high occupant weight.

4 Claims, 2 Drawing Sheets

CAPACITIVE LOAD CELL WITH MULTI-LAYER DIELECTRIC FOR EXTENDED RANGE

TECHNICAL FIELD

The present invention relates to a capacitive load cell for estimating occupant weight applied to a vehicle seat, and more particularly to a load cell having a dielectric material that enhance the range of weight estimation.

BACKGROUND OF THE INVENTION

Various sensing technologies have been utilized to classify the occupant of a vehicle seat for purposes of determining whether to enable or disable air bag deployment, and/or for purposes of determining how forcefully an air bag should be deployed. The present invention is directed to an approach in which at least one capacitive load cell is installed in a vehicle seat, and the capacitance of the load cell is measured to provide an indication of the weight applied to the seat and/or the distribution of the applied weight. In general, a capacitive load cell includes at least first and second conductive plates separated by a compressible dielectric such as a sheet of rubber, plastic or polymeric foam. For example, representative capacitive load cells are disclosed in the U.S. Pat. No. 4,266,263 to Haberl et al., issued on May 5, 1981. Additionally, the U.S. Pat. No. 4,836,033 to Seitz; U.S. Pat. No. 5,878,620 to Gilbert et al.; U.S. Pat. No. 6,448,789 to Kraetzl; and U.S. Pat. No. 6,499,359 to Washeleski et al. show capacitive load cells as applied to vehicle seats for sensing occupant weight or weight distribution.

SUMMARY OF THE INVENTION

The present invention is directed to an improved capacitive load cell apparatus for estimating occupant weight applied to a vehicle seat, where the load cell includes upper and lower capacitor plates and an intermediate dielectric comprising two or more layers of compressible material with diverse compressibility characteristics. The most easily compressed dielectric layer provides sensitivity to low occupant weight, while the less easily compressed dielectric layer(s) provide sensitivity to medium and high occupant weight.

DESCRIPTION OF THE PREFERRED EMBODIMENT

While the capacitive load cell apparatus of the present invention may be used in various applications, it is disclosed herein in the context of an apparatus for detecting the weight and/or distribution of weight applied to a vehicle seat. In general, a capacitive load cell comprises upper and lower conductor plates separated by a compressible non-conductive dielectric, such that mechanical loading of the cell compresses the dielectric, increasing the electrical capacitance between the upper and lower conductor plates. As applied to a vehicle seat, the capacitive load cell is preferably disposed between the frame and bottom cushion of the seat as depicted herein, but it will be understood that the load cell may be installed in a different location such as in the bottom cushion, in or behind a back cushion, and so on.

Figure 1:
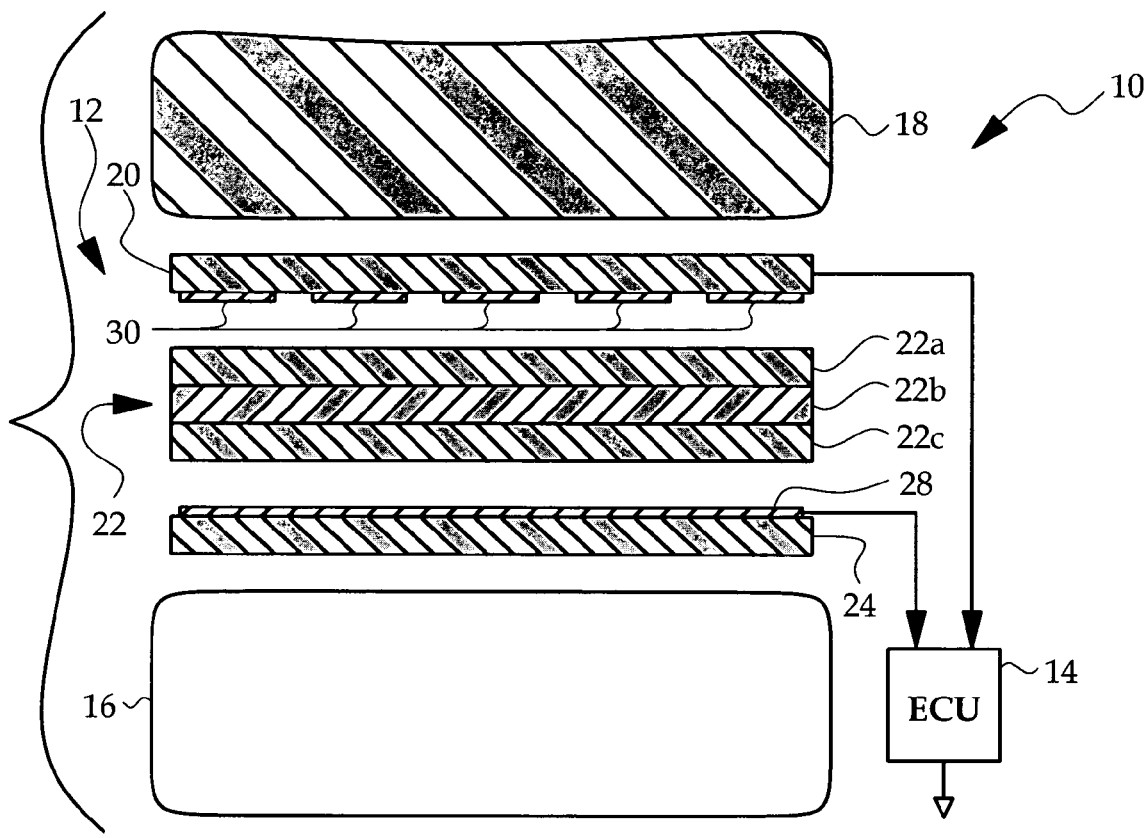
FIG. 1 is an exploded diagram of a vehicle seat and a sensing apparatus including a capacitive load cell having a multi-layer compressible dielectric in accordance with the present invention.

Referring to FIG. 1, the reference numeral 10 generally designates a seat bottom and sensor apparatus according to this invention. The sensor apparatus includes a capacitive load cell 12 and an electronic control unit (ECU) 14. The load cell 12 is disposed between the seat frame 16 and a foam cushion 18, and includes an upper substrate 20, a dielectric 22, and a lower substrate 24. A reference plane conductor 28 is formed on lower substrate 24 adjacent the lower surface of dielectric 22, and a number of charge plate conductors 30 are formed on upper substrate 20 adjacent the upper surface of dielectric 22. The upper and lower substrates 20, 24 are non-conductive, and may be formed of a material such as polyurethane with a thickness of about 0.5 mm, for example. The conductors 28, 30 may be metal foil pads laminated to the respective substrates 24, 20. The reference plane conductor 28 and each of the charge plate conductors 30 are separately coupled to ECU 14, which periodically measures capacitance values between the reference plane conductor 28 and each of the charge plate conductors 30. The measured capacitances provide an indication of the weight applied to seat cushion 18, as well as the distribution of the weight, for purposes of detecting the presence of an occupant and classifying the occupant as a child, an adult, a child seat, or some other classification.

Figure 2:
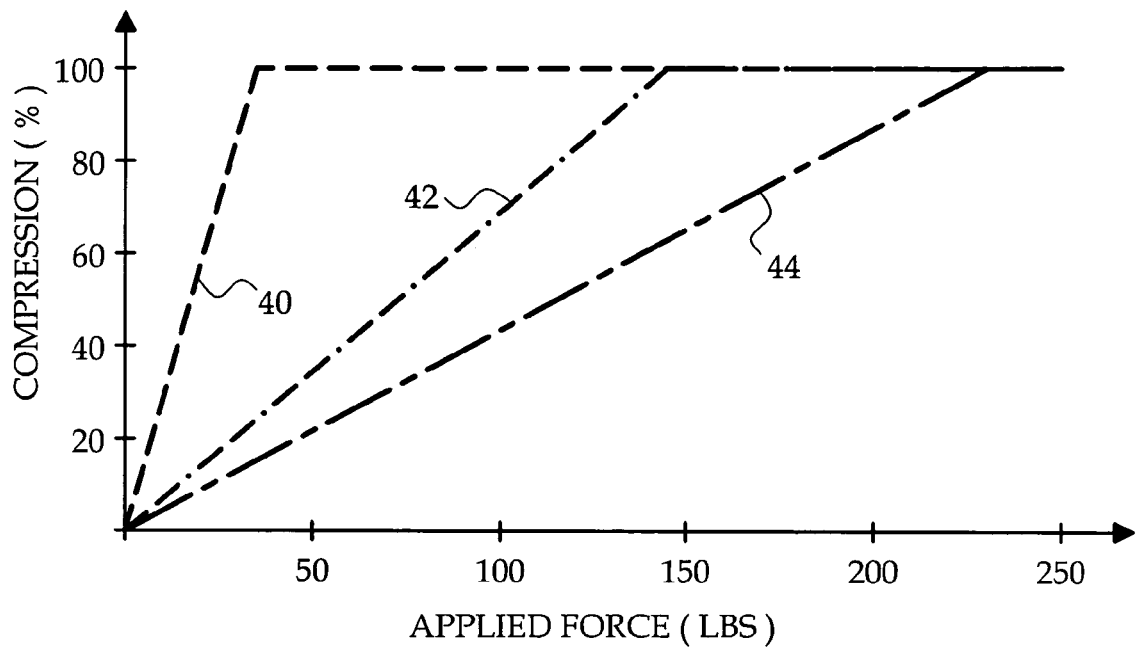
FIG. 2 is a graph depicting the compressibility of the individual dielectric layers of the load cell of FIG. 1.
Figure 3:
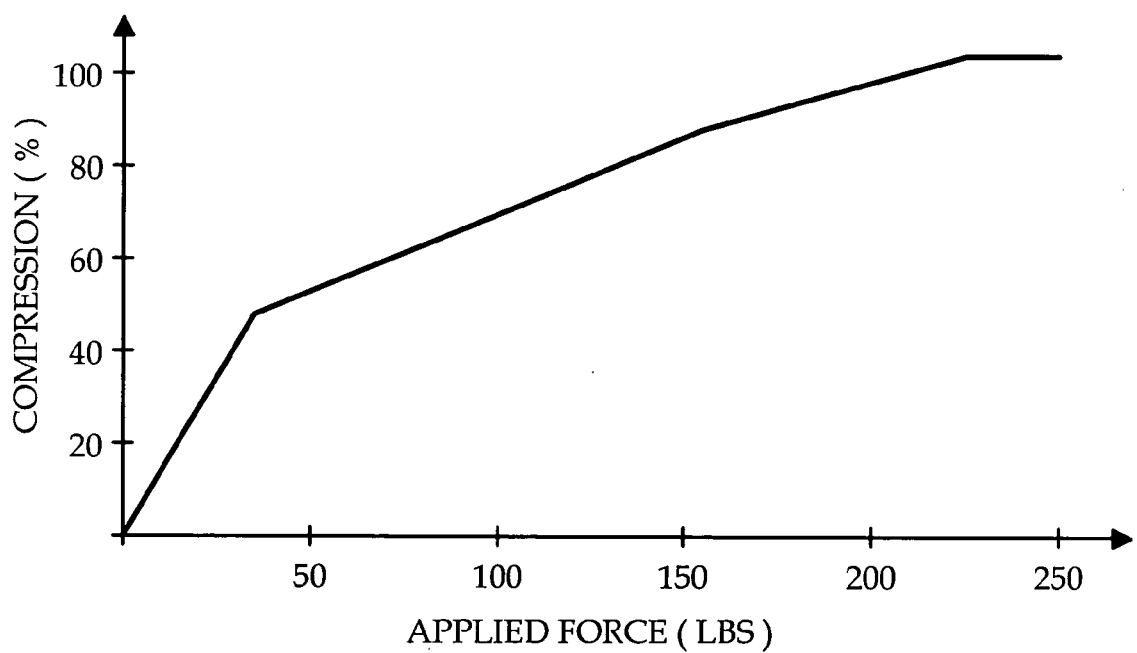
FIG. 3 is graph depicting the overall compressibility of the multi-layer dielectric of the load cell of FIG. 1.

According to the present invention, the dielectric 22 includes multiple layers of diverse compressibility so that load cell 12 will exhibit continuous variation in capacitance over a wide range of applied occupant weight. In the illustrated embodiment, the dielectric 22 includes three juxtaposed layers 22a, 22b, 22c of successively lower compressibility. The top layer 22a is relatively soft (i.e., easily compressible), and becomes fully compressed in response to an applied force of approximately 35 pounds, as illustrated by trace 40 in FIG. 2. The middle layer 22b is firmer than the top layer 22a, and becomes fully compressed in response to an applied force of approximately 155 pounds, as illustrated by trace 42 in FIG. 2. The bottom layer 22c is firmer than the middle layer 22b, and becomes fully compressed in response to an applied force of approximately 240 pounds, as illustrated by trace 44 in FIG. 2. FIG. 3 depicts the combined compressibility characteristic of the three layers 22a, 22b and 22c. The overall compression of the dielectric 22 produces a continuous and high-gain relationship between applied occupant weight and separation distance between the ground plane conductor 28 and respective charge plate conductors 30 (and therefore, the measured capacitances) over a wide range of applied occupant weight. This enables ECU 14 to reliably characterize occupant weight over a much wider range than could be achieved with any dielectric of uniform compressibility.

Preferably, the dielectric layers are each formed of open-cell or closed-cell urethane foam, although other materials such as rubber may alternatively be used. In any event, the dielectric material must be producible with different degrees of compressibility. The compressibility or load bearing capacity of foam is commonly defined in terms of the Indentation Load Deflection (ILD) and is generally given as the force in pounds required to compress the foam to a specified percentage of its initial height. By way of example, the top layer 22a of the illustrated embodiment may have an ILD rating of 10 pounds, the middle layer 22b may have an ILD rating of 30 pounds, and the bottom layer 22c may have an ILD rating of 50 pounds. Also, the dielectric 22 may be manufactured as a multilayer assembly, or individually combined during assembly of load cell 12; in the later case, the various dielectric layers may be color coded by compressibility to ensure proper and consistent assembly.

While the present invention has been described with respect to the illustrated embodiment, it is recognized that numerous modifications and variations in addition to those mentioned herein will occur to those skilled in the art. For example, the load cell dielectric may comprise more or fewer layers of compressible material than in the illustrated embodiment, the load cell may be used in non-automotive environments, the charge plate conductors 30 may be single conductor instead of multiple individual conductors, and so on. Also, the dielectric layers need not be arranged in any particular order of compressibility; for example, the least compressible layer may be on top, and so forth. Accordingly, it is intended that the invention not be limited to the disclosed embodiment, but that it have the full scope permitted by the language of the following claims.

The invention claimed is:

1. Capacitive load cell apparatus including first and second conductor plates separated by a compressible dielectric such that force applied to the load cell compresses the dielectric to increase a capacitance between the first and second conductor plates, the improvement wherein:

the compressible dielectric includes at least first and second juxtaposed layers of compressible dielectric material, where the at least first and second layers exhibit different degrees of compressibility such that the capacitance between the first and second conductor plates varies over an extended range of applied force, said first layer becoming fully compressed in response to a first amount of applied force, and said second layer becoming fully compressed in response to a second amount of applied force that is greater than said first amount of applied force.

2. Capacitive load cell apparatus including first and second conductor plates separated by a compressible dielectric such that force applied to the load cell compresses the dielectric to increase a capacitance between the first and second conductor plates, the improvement wherein:

the compressible dielectric includes first, second and third layers of compressible dielectric material that exhibit successively increasing degrees of compressibility such that the capacitance between the first and second conductor plates varies over an extended range of applied force.

3. The apparatus of claim 1, where said compressible dielectric exhibits an overall compressibility that is a function of the compressibilities of the at least first and second layers of dielectric material.

4. The apparatus of claim 1, where the at least first and second layers of dielectric material are formed of urethane foam.

* * * * *